United States Patent [19]

Fischer et al.

[11] 3,951,242

[45] Apr. 20, 1976

[54] HYDRAULIC BRAKE FOR HEAVY VEHICLES

[75] Inventors: Hans Fischer, Zeiering, Post Bernhaupten; Julius Liebel, Unterwossen, both of Germany

[73] Assignee: Maschinenfabrik Augsburg-Nurnberg AG, Nurnberg, Germany

[22] Filed: Nov. 21, 1974

[21] Appl. No.: 525,971

Related U.S. Application Data

[63] Continuation-in-part of Ser. No. 196,825, Nov. 4, 1971, abandoned.

[30] Foreign Application Priority Data

Nov. 14, 1968 Germany............................ 1808798

[52] U.S. Cl............................ 188/296; 188/264 B; 60/337; 60/339
[51] Int. Cl.²...................................... F16D 57/02
[58] Field of Search ............ 188/296, 264 B, 264 E, 188/291; 192/3.34, 3.23; 60/337, 339, 341

[56] References Cited
UNITED STATES PATENTS

| | | | |
|---|---|---|---|
| 2,416,948 | 3/1947 | Pavlecka............................ | 60/339 X |
| 2,748,570 | 6/1956 | Booth............................ | 188/296 X |
| 2,827,989 | 3/1958 | Christenson..................... | 188/296 X |
| 2,837,285 | 6/1958 | Urban............................... | 60/337 X |
| 3,334,711 | 8/1967 | Anderson......................... | 188/296 X |
| 3,490,567 | 1/1970 | Clark et al....................... | 188/296 X |
| 3,565,218 | 2/1968 | Franke............................. | 60/337 X |

*Primary Examiner*—George E. A. Halvosa
*Attorney, Agent, or Firm*—Walter Becker

[57] ABSTRACT

A non-exhaustable permanent brake for a vehicle motor, which includes a fluid operable braking unit arranged in the housing of the vehicle motor and comprising a pump wheel which is drivingly connected to the crankshaft of the motor and is interposed in a liquid lubricant circulating circuit. This pump wheel has associated therewith a follower which normally is freely and under no load rotated by the liquid lubricant circulated by the pump wheel but can be arrested by a friction brake to brake the pump wheel and thereby the motor.

3 Claims, 3 Drawing Figures

HYDRAULIC BRAKE FOR HEAVY VEHICLES

This application is a continuation-in-part application of continuation application Ser. No. 196,825 filed Nov. 4, 1971 (now abandoned), based on parent application Ser. No. 875,692 filed Nov. 12, 1969 (now abandoned).

The present invention relates to a non-exhaustable permanent brake for heavy street vehicles, which comprises a hydraulically operating brake unit and a friction brake operable to act upon said brake unit.

From a certain total weight on of heavy street vehicles, it is expedient and by traffic laws mandatory, to provide for the installation in such vehicles of a non-exhaustable permanent brake.

The most simple method in this connection consists in temporarily converting the internal combustion engine into an energy destroying device, by employing a so-called exhaust flap (in the case of Diesel engines) in such a way that the internal combustion engine must convey the drawn-in air during the exhaust stroke against the closed exhaust pipe. The power intake of such a brake is dependent on the stroke volume of the engine and not always corresponds to the desired equivalent of the total weight of the vehicle, particularly not when supercharged engines are involved.

Another method of carrying out a non-exhaustable braking operation consists in that —mostly at the end of the transmission— there is provided an electrical eddy current brake which therefore is rather large and heavy in order to realize the necessary braking effect because the speed of the universal drive shaft is relatively low during a relatively slow downward drive. These eddy current brakes have to be cooled by air and to this end the brake runner or impeller is in most instances designed as a hollow cast fan. Such fan, however, absorbs useful power when the vehicle drives at its normal speed. Instead of such eddy current brake, it is also possible to employ a hydraulic brake which, however, similar to the eddy current brake will during normal driving exert a ventilation resistance and for purposes of braking has to be filled with a brake fluid, in most instances cooling water of the motor, through complicated pipelines and valves, and has to be emptied again at the end of the braking operation. The period of response is therefore relatively long and it not in all instances in conformity with the traffic conditions or requirements. Moreover, such brake is relatively large.

It is, therefore, an object of the present invention to provide a permanent brake of the above mentioned general type which will be of relatively small construction and which during normal driving will not absorb unnecessarily useful power while on the other hand will be able to respond quickly.

It is another object of this invention to provide a brake as set forth in the preceding paragraph, in which the braking effect will be independent of the stroke volume of the engine.

These and other objects and advantages of the invention will appear more clearly from the following specification in connection with the accompanying drawings, in which.

Figure 3:
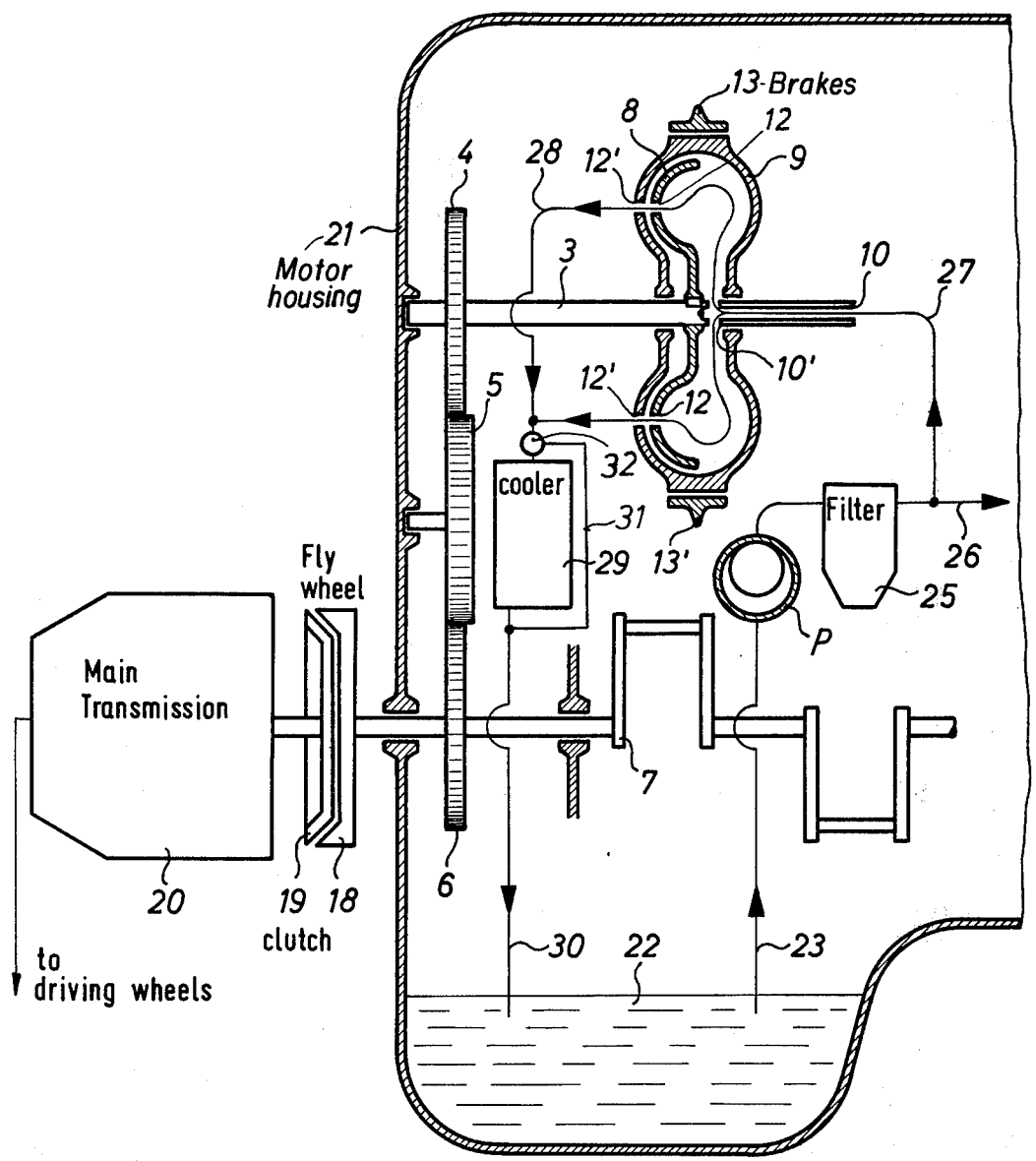

FIG. 3 diagrammatically illustrates the overall arrangement of a vehicle drive with a permanent brake according to the invention.

The non-exhaustable brake according to the present invention for heavy street vehicles includes a hydraulically operable brake unit and a friction brake operable to act upon the brake unit while said brake unit is always completely filled with a hydraulic fluid which consists of the motor lubricant provided for lubricating the bearing means as well as the piston, said motor lubricant being passed continuously through a circuit. The brake unit is not interposed in the drive for the vehicle but is arranged in the vehicle motor and comprises a pump wheel which is driven directly by the crank shaft of the motor through the intervention of a step-up gear transmission, and furthermore comprises a follower designed as a housing which rotates freely and under no load, said follower being coupled to the pump wheel during the normal vehicle drive by means of the rotating motor lubricant and only during the braking operation being held stationary by the friction brake while the energy converted into heat due to the turbulence of the motor lubricant in the braking unit is conveyed directly to the entire motor even when the vehicle drives slowly downwardly.

According to a further development of the invention, it is suggested to install a cooler in the return conduit which leads from the brake unit to the oil pan. This cooler has associated therewith a corresponding thermostat or a similar device which causes the cooler to become effective only in conformity with the temperature of the motor lubricant when during very long downhill drives or for other reasons the oil reaches too high a temperature.

It is furthermore suggested as friction brake to employ preferably a mechanically hydraulically or pneumatically controlable double jaw brake while the two brake jaws engage the circumference of the follower. Double jaw brakes have over other designs, especially over band brakes, the advantage that they do not grab and act in a jerky manner.

Figure 1:
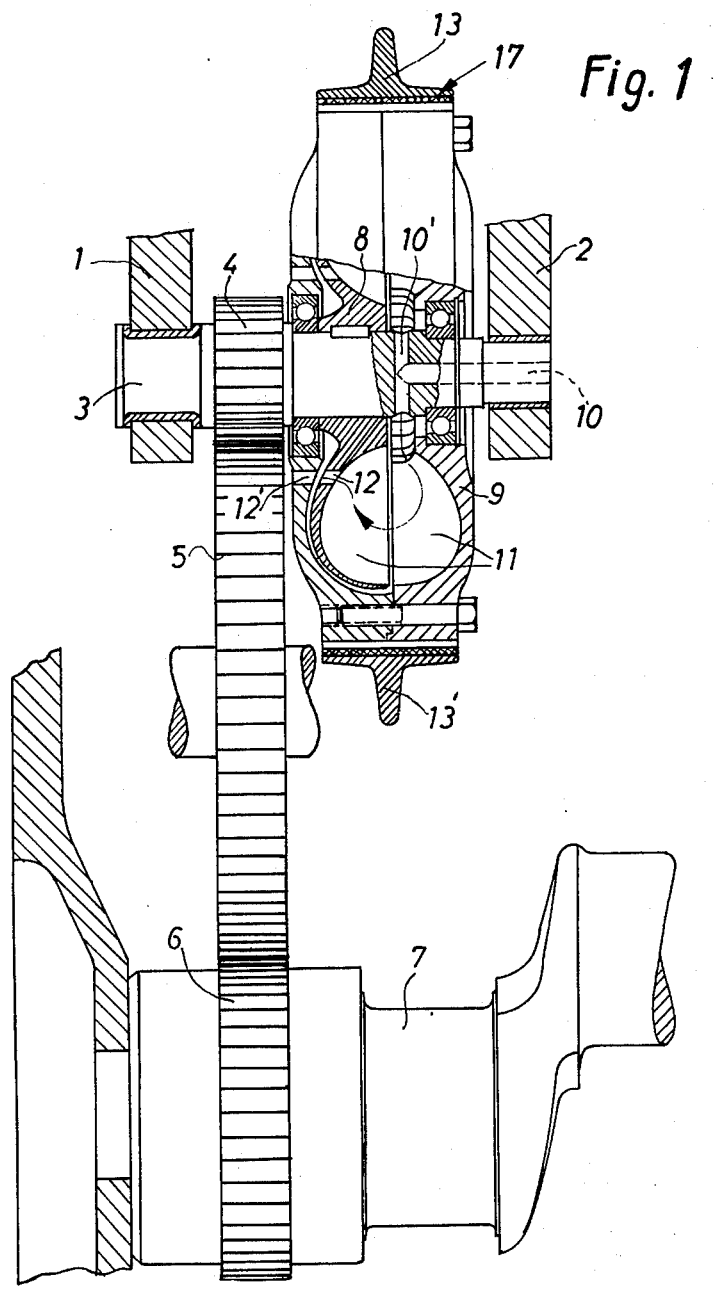
FIG. 1 illustrates a longitudinal section through a brake unit according to the present invention.

Referring now to the drawings in detail, and FIG. 1 thereof in particular, the arrangement shown therein comprises bearing supports 1 and 2 in the motor, and preferably in the crankshaft housing, on which supports shaft 3 of the brake unit is journalled in customary manner. The shaft 3 of the brake unit is in conformity with the discretion of the designer driven at a transmission ratio by means of a gear transmission 4, 5, and 6 so that the brake unit proper can be designed relatively small. The gear 6 is arranged at the rear end of the crankshaft 7 and at the same time may serve for driving the control units of the motor. Fixedly keyed to the shaft 3 is a pumping wheel 8 of the brake unit while a follower 9 is freely rotatably journalled on shaft 3. Oil which keeps the hollow chamber 11 of the braking unit filled is continuously conveyed through a bore 10, 10' to the center of the rotating brake unit. The flow of the oil back directly to the oil sump of the motor is effected through bores 12, 12'. The circumference of the follower 9 is surrounded by two braking jaws 13, 13' of a double jaw brake serving as friction brake.

Figure 2:
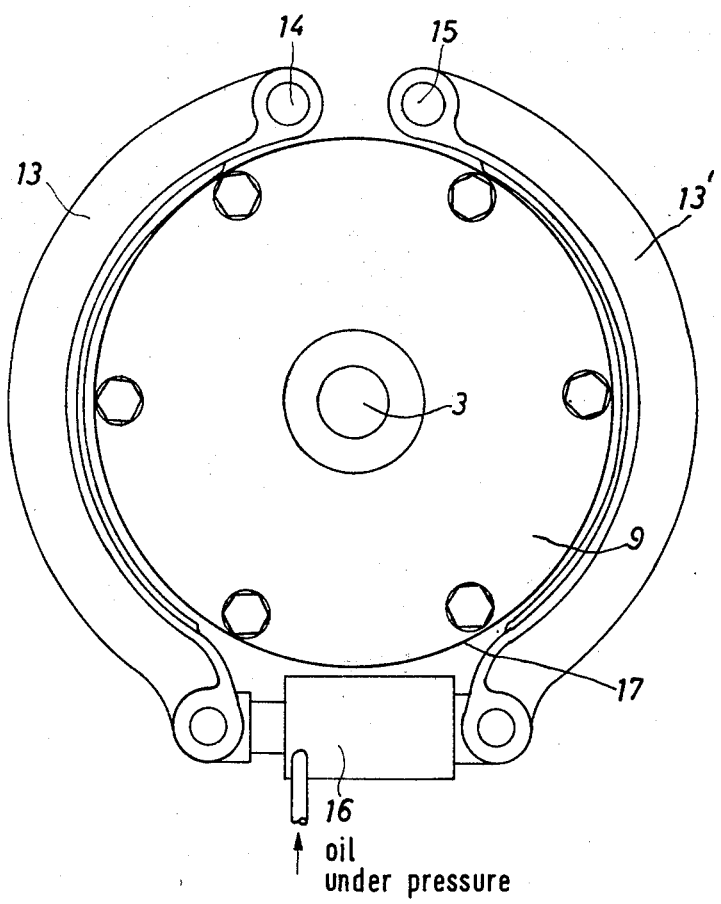
FIG. 2 represents a view of the arresting device for the follower.

According to the showing in FIG. 2, the two brake jaws 13, 13' of the double jaw brake are pivotally mounted on bolts 14, 15 which are fastened in the crank housing. Pressure cylinders 16 which engage the free ends of the jaws 13, 13' are operable to cause the two jaw brakes 13, 13' to engage the circumferential surface 17 of the follower 9 to thereby prevent the latter from turning.

From the diagram illustrated in FIG. 3, it will be seen that outside the motor housing 21 to the crank shaft 7 a fly wheel 18 is connected which has arranged adjacent thereto a coupling 19 for disengaging the transmission 20 from the motor.

The motor is in a manner known per se provided with an oil sump 22 from which a suction line 23 leads to a pump P by means of which the motor lubricant through a filter 25 is conveyed into a conduit 26 for piston cooling and bearing lubricating purposes and leads into a conduit 27 for the brake unit. After the motor lubricant has passed through the brake unit, the motor lubricant is through a discharge line 28, a bypass line 31, and further through the conduit 30 conveyed back to the oil sump. When the motor lubricant, which leaves the brake unit, for certain reasons reaches a certain selected temperature, the bypass line 31 is blocked by a thermostat 32, and the heated up motor lubricant is through a cooler 29 and subsequently through conduit 30 conveyed to the oil sump 22. When the driver intends to carry out a braking operation, he actuates, preferably by his left foot, a non-illustrated compressed air valve so that compressed air acts upon the cylinder 16 (FIG. 2) and the brake jaws 13, 13' are actuated while simultaneously care is to be taken that in customary manner by means of a non-illustrated, preferably compressed air operable adjusting member, the control rod of the injection pump (with Otto motors, an equivalent element in the suction line) is pressed into zero output position for the motor. As soon as the follower 9 is stopped while the motor driven pump wheel 8 rotates, the desired braking effect occurs and the occurring braking heat is carried away by the continuously flowing oil flow through the passages 10, 10' and 12, 12'.

Due to the organic connection of the hydraulic delaying device as permanent brake with the motor, the occurring braking heat will even during longer periods in a convenient manner be conveyed to the cooling system of the motor and will eventually be conveyed to the surrounding air. In this connection the very favorable effect is realized that the motor lubricant as also (when water cooled engines are employed) the cooling medium is kept at the desired temperature of operation. Cooling off with high temperature drops which otherwise might be possible is in this way absolutely avoided.

Due to the fact that the braking unit is always completely filled with hydraulic fluid and does not have to be filled prior to each operation, an immediate response is assured. Furthermore, the hydraulic fluid cannot form any foam as is the case for instance with some heretofore known units of the type involved which are only partially filled under certain conditions of operation. The possible formation of foam may, when suddenly braking, bring about a considerable delay in the time of response. Due to the drive of the pump wheel through a step-up gear transmission directly from the crankshaft, the braking unit may, depending on the selected transmission ratio of the transmission be built very small while still being able to bring about a complete braking effect. This arrangement also has the important advantage that the braking effect by selecting a corresponding velocity is adaptable to the respective traffic conditions. If the drive of the unit is effected from the transmission or is mounted only past the latter, the opposite effect would occur namely at low speeds, as for instance when downhill driving, also a slow braking effect would occur. The desired independence of the braking effect from the stroke volume of the motor is with the arrangement according to the invention, of course, likewise realized. Since during the normal downhill drive the follower of the braking unit, which follower is designed as a housing, is in completely non-loaded condition coupled to the pump wheel by the circulating hydraulic fluid and follows freely, no unnecessary useful power is absorbed.

A further advantage of the arrangement according to the present invention consists in that as hydraulic fluid the motor oil is employed which simultaneously serves as lubricant for the bearings and for cooling the pistons. In this way, the entire motor is also during a long downhill drive always directly kept uniformly warm and not indirectly through the cooling water. Furthermore, the awkward and complicated conduit system necessary when employing the cooling water for braking purposes will become unnecessary.

It should also be noted that the permanent brake according to the invention can during the winter period very well be employed for a fast heating up of the motor. To this end, the brake is pulled while the vehicle is standing still and the motor lubricant will thus due to its turbulence warm up faster.

Finally it may also be mentioned as an important advantage that due to the arrangement of the brake unit within the vehicle motor, all heretofore known devices and conduits for collecting leakage oil will become superfluous because any oil which might escape can at any time freely return to the oil pan of the motor.

It is, of course, to be understood that the present invention is, by no means, limited to the specific showing in the drawings but also comprises any modifications within the scope of the appended claims.

What we claim is:

1. In combination with a vehicle motor having a motor housing, a crankshaft, a reservoir for receiving and containing a liquid lubricant, and liquid lubricant circulating circuit means comprising oil pump means and communicating with said reservoir for circulating liquid lubricant to and through parts of said motor to be lubricated: a permanent brake which includes: a fluid-operable braking unit within said motor housing and interposed within said lubricant circulating circuit means and supplied by said pump means so as to be continuously and completely filled with liquid lubricant during operation of said motor; said braking unit comprising auxiliary shaft means, means operable to drivingly connect said crankshaft to said auxiliary shaft means for driving the latter, said braking unit having a pump wheel keyed to said auxiliary shaft means so as to be rotatable therewith, and follower means freely and substantially in a load-free manner rotatable about the axis of said auxiliary shaft means by lubricant in said braking unit in response to the rotation of said pump wheel; and friction brake means associated with said follower means and operable selectively to engage and arrest the latter to thereby cause the lubricant in said brake unit to absorb a considerable amount of rotary energy of said pump wheel and thus to impart upon the lubricant circulated through said brake unit and said circuit means a temperature sufficient to keep said motor uniformly warm even during a longer lasting downhill drive of a vehicle equipped with said motor even in winter time weather.

2. An arrangement in combination according to claim 1, in which said motor has main transmission means and clutch means for selectively establishing and interrupting driving connection between said main transmission and said crankshaft, and in which said means operable to drivingly connect said crankshaft to said auxiliary shaft means includes intermediate transmission means.

3. An arrangement in combination according to claim 1, which includes cooler means arranged in parallel to said lubricant circulating circuit means, and also includes temperature responsive means associated with said cooler means and said lubricant circulating circuit means, said temperature responsive means being adapted to be set for a selected maximum temperature in said lubricant circulating circuit to force the lubricant in said circuit means to pass through said cooler means in response to said set temperature prevailing in said circulating circuit means.

* * * * *